C. FORTH.
PIPE JOINT.
APPLICATION FILED FEB. 10, 1912.

1,202,502.

Patented Oct. 24, 1916.
3 SHEETS—SHEET 2.

C. FORTH.
PIPE JOINT.
APPLICATION FILED FEB. 10, 1912.
1,202,502.
Patented Oct. 24, 1916.
3 SHEETS—SHEET 3.
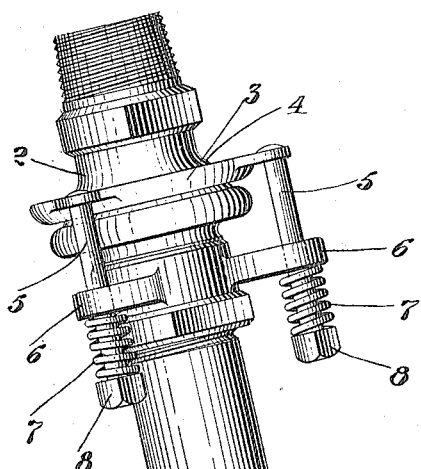
Fig. 4.
WITNESSES:
INVENTOR:
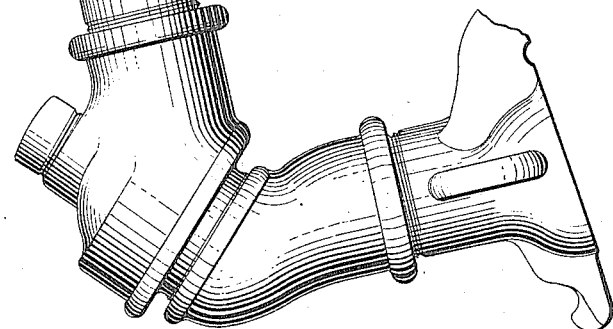

UNITED STATES PATENT OFFICE.

CHARLES FORTH, OF BOSTON, MASSACHUSETTS.

PIPE-JOINT.

1,202,502.  Specification of Letters Patent.  Patented Oct. 24, 1916.

Application filed February 10, 1912. Serial No. 676,865.

*To all whom it may concern:*

Be it known that I, CHARLES FORTH, a citizen of the United States, residing at Boston, in the county of Suffolk and State of Massachusetts, have invented certain new and useful Improvements in Pipe-Joints, of which the following is a specification, reference being had therein to the accompanying drawing.

This invention relates to pipe joints, the object being to provide a joint which will permit the parts to be moved freely relative to each other in all directions, while at the same time a fluid-tight connection between the parts will be maintained.

My invention is designed with special reference to the use of my improved joint in connection with railway train pipe systems for air or steam, to enable pipe terminals of metal to be employed between the cars, instead of rubber; and the invention consists of a joint of the "ball and socket" type comprising two members seated one within the other so that they may rock relatively to each other in all directions, and means for maintaining the parts in operative relation, the said means consisting of a yoke loosely engaging one of the members, and a spring sustained by the other member and acting, through the medium of the yoke, to hold the ball member seated in the socket member.

The invention consists also in certain details of construction and combination of parts hereinafter described and claimed.

Figure 1:
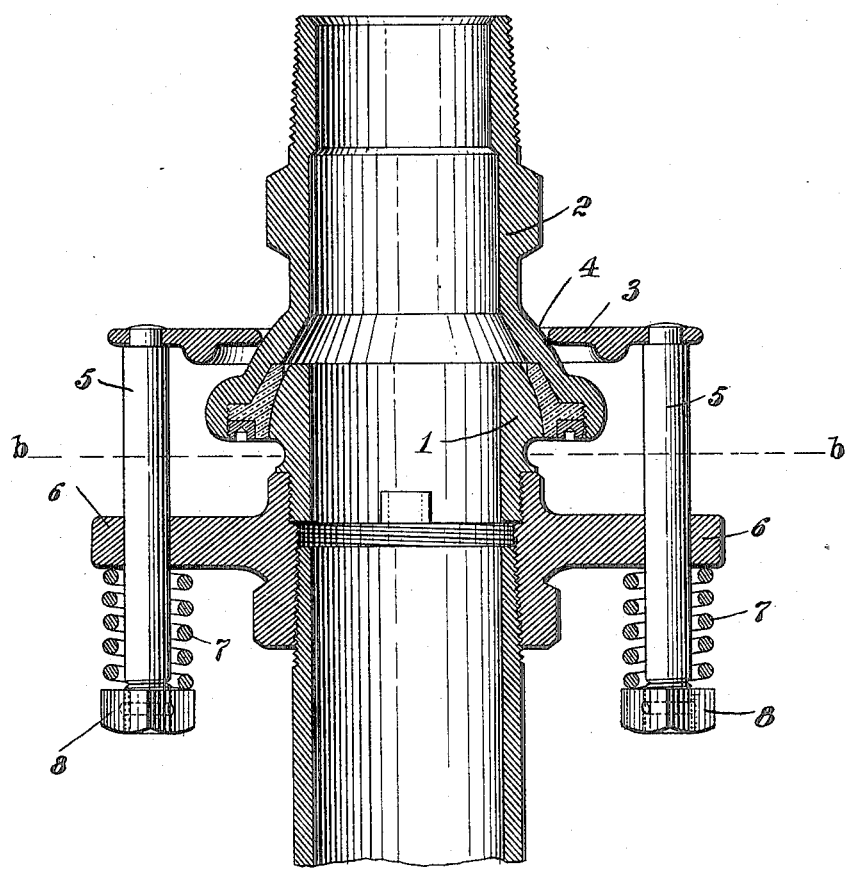
Figure 2:
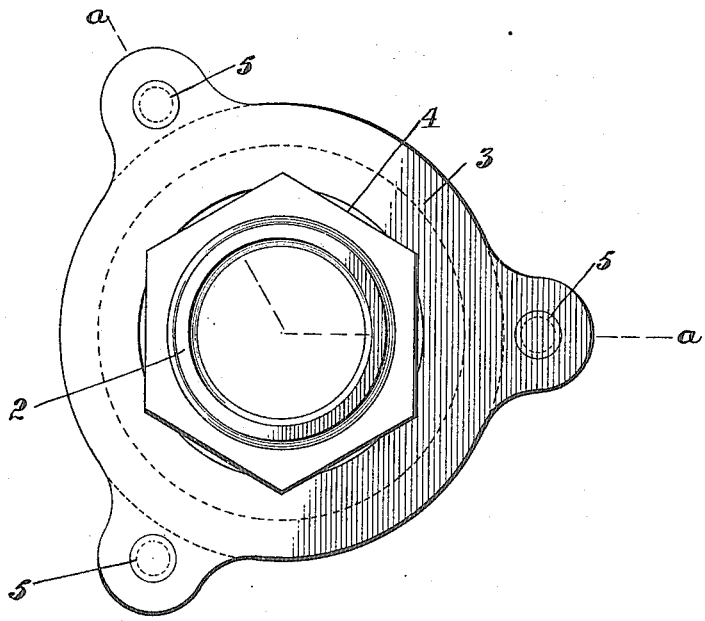
Figure 3:
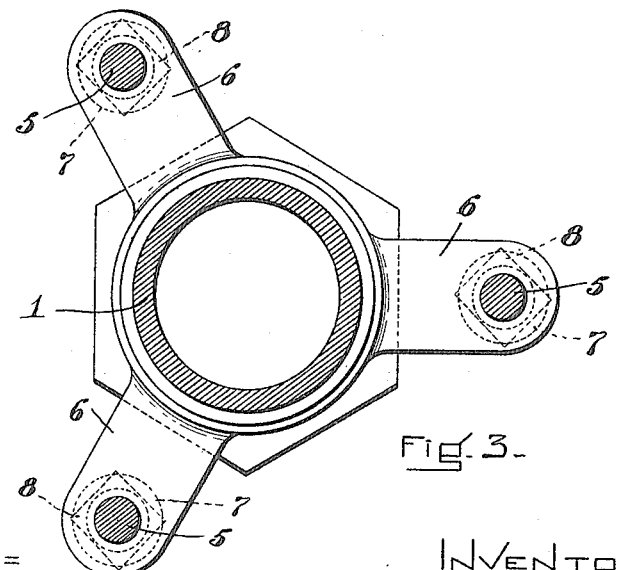

In the accompanying drawings: Figure 1 is a longitudinal central section through a pipe joint constructed in accordance with my invention on the line *a—a* of Fig. 2. Fig. 2 is an end elevation of the pipe joint. Fig. 3 is a transverse sectional elevation on the line *b—b* of Fig. 1. Fig. 4 is a side elevation of the joint on a reduced scale, showing the same applied to a pipe terminal.

My improved joint comprises a ball member 1, and a socket member 2, the ball member being seated in the socket member so that the parts may rock relatively to each other universally, as is common in joints of this type. In order that the parts may be held in operative relation, with the ball member seated in the socket member, and at the same time be permitted to move relatively universally, I provide an improved form of connecting device, comprising a yoke 3, having a central opening loosely surrounding the socket member and bearing on an external spherical surface 4 formed on said member, the center of which is coincident with the centers of the meeting spherically-formed surfaces of said members, this arrangement permitting the yoke to rock or tip relative to said surface in all directions. Connected fixedly with the yoke and extending longitudinally of the joint, are a number of stems, three in the present instance, 5, 5, 5, which stems are extended loosely through guiding openings in a number of arms 6, 6, 6, projecting laterally and fixedly from the ball member, spiral springs 7 being applied to the respective stems and bearing at their ends against the arms and against heads 8 on the ends of said stems, which springs act to draw the yoke toward the ball member, and through the medium of the yoke, to hold the said member seated firmly but yieldingly in the socket member.

As a result of the construction described, the two members are held yieldingly in operative relations to each other, with the ball member seated movably in the socket member, the yoke, by reason of its engagement with the external spherical surface of the socket member, permitting the two members to be moved universally in relation to each other about a common axis coincident with the centers of the spherical engaging surfaces of said members.

The joint thus formed is of extreme simplicity in construction, and while capable of the universal movement of the parts relatively to each other, these parts are maintained in yielding and close contact so as to effectually prevent the liability of leakage of the fluid between them, the spring-action of the connecting devices, maintaining such contact automatically without reference to the relative positions of the members in their rocking motions, and without regard to any variation due to expansion or contraction under the influences of heat or cold.

It will be manifest that while the joint is shown as embodying the detailed construction described, such construction may be modified and changed within the skill of the mechanic without departing from the limits of my invention. For instance, instead of the external spherical surface being formed on the socketed member to coöperate with the yoke, and with the spring sustained by the ball member, this arrangement may be reversed, and the spherical external surface formed on the ball member, and the springs sustained by the socket member, the operation in both instances being the same, as far as the function of the yoke and springs in maintaining the proper connection between the parts, while permitting their universal action, is concerned; and the invention, it will be understood, is not limited to any particular form or construction of the parts, except in so far as such limitations are specified in the claim.

Having thus described my invention, what I claim is:

In a pipe joint, the combination of a socket member having an opening therethrough and having a spherically-curved bearing socket, a ball member having an opening therethrough and having a spherically-curved surface seated in said socket and struck from the same center as that of said socket, said members being movable relatively to each other universally about their common center, and said socket member being provided further with an external curved bearing surface whose center is coincident with the common center of motion, a yoke having an opening loosely encircling said external spherical bearing surface of the socket member and rockable thereon universally, a plurality of stems fixedly connected with said yoke and extending longitudinally, projections fixed to the ball member through which said stems slidingly extend, and springs encircling the stems and bearing respectively against the projections and the stems and serving to maintain the said members in yielding fluid-tight operative relations.

In testimony whereof I affix my signature in presence of two witnesses.

CHARLES FORTH.

Witnesses:
 JOSIAH S. DEAN,
 DRYDEN A. CUSHMAN.

Copies of this patent may be obtained for five cents each, by addressing the "Commissioner of Patents, Washington, D. C."